United States Patent [19]

Nagase et al.

[11] Patent Number: 4,524,310
[45] Date of Patent: Jun. 18, 1985

[54] METHOD AND APPARATUS OF CONTROLLING INDUCTION MOTORS

[75] Inventors: Hiroshi Nagase, Hitachi; Toshiaki Okuyama, Toukai, both of Japan

[73] Assignee: Hitachi, Ltd., Tokyo, Japan

[21] Appl. No.: 455,294

[22] Filed: Jan. 3, 1983

[30] Foreign Application Priority Data

Jan. 11, 1982 [JP] Japan .................................. 57-1812

[51] Int. Cl.³ .............................................. H02P 5/40
[52] U.S. Cl. ..................................... 318/808; 318/801
[58] Field of Search ................. 318/803, 801, 807–811

[56] References Cited

U.S. PATENT DOCUMENTS

| | | | |
|---|---|---|---|
| 4,023,083 | 5/1977 | Plunkett | 318/810 |
| 4,041,361 | 8/1977 | Cornell | 318/808 |
| 4,230,979 | 10/1980 | Espelange et al. | 318/803 |
| 4,281,276 | 7/1981 | Cutler et al. | 318/803 |
| 4,322,671 | 3/1982 | Kawada et al. | 318/811 |
| 4,330,791 | 5/1982 | Nagase et al. | 318/808 |
| 4,437,051 | 3/1984 | Muto et al. | 318/808 |

*Primary Examiner*—David Smith, Jr.
*Attorney, Agent, or Firm*—Antonelli, Terry & Wands

[57] ABSTRACT

An induction motor is driven by a converter which outputs a variable frequency and variable phase A.C. voltage. The frequency is instructed by a signal which corresponds to a difference between a detected speed signal and set speed signal, a signal which corresponds to a difference between a detected magnetic flux intensity signal and set flux signal, and the detected speed signal.

10 Claims, 8 Drawing Figures

METHOD AND APPARATUS OF CONTROLLING INDUCTION MOTORS

BACKGROUND OF THE INVENTION

The present invention relates to a method and apparatus of controlling induction motors, according to which the primary current of an induction motor is controlled being divided into an excitation component and a torque component.

A high-response control method for induction motors can be represented by a vector control method, according to which the excitation current component and the torque current component of the primary current of an induction motor are independently controlled, making it possible to obtain speed response characteristics which are comparable with those of a d-c motor. In the vector control method, the phase of magnetic flux must be detected to control the frequency, phase and magnitude of the primary current with the phase of magnetic flux of the induction motor as a reference. To find the phase of magnetic flux, a flux detector may be attached to the induction motor. This, however, makes it difficult to use general-purpose induction motors. In practice, therefore, the slip frequency of the induction motor is calculated to instruct the phase of magnetic flux.

This method, however, presents a problem described below.

The slip frequency $f_s$ is instructed as given by the following relation, $$f_s = \frac{1}{2\pi} \left( \frac{r_2}{l_2 + l_m} \cdot \frac{1}{I_m} \right) I_2 = K I_2 \qquad (1)$$

where $r_2$, $l_2$ and $l_m$ denotes quantities that are proportional to the secondary resistance, secondary leakage reactance and excitation inductance of an induction motor, $I_m$ denotes a quantity proportional to an excitation current component of the primary current, and $I_2$ denotes a quantity proportional to a torque current component.

An intensity of the magnetic flux usually remains constant. That is, the excitation current component $I_m$ remains constant, and the slip frequency $f_s$ is given by a relation $f_s = K I_2$ which varies in proportion to the current instruction $I_2$ that corresponds to the torque instruction. Here, a constant K is a quantity which is concerned with the constants ($r_2$, $l_2$, $l_m$...) of an induction motor. Therefore, the constant K must be determined to be in agreement with the constants of the induction motor.

However, it is difficult to bring the constant K set in the control circuit into agreement with the real motor constants. Moreover, since the motor constants vary depending upon the operation conditions, it is difficult to follow the constant K set in the control circuit into agreement with the real motor constants under operation.

To solve this problem, a method has been proposed according to which the secondary resistance of an induction motor is measured or is indirectly found by calculation, to change a parameter which is related to the secondary resistance of vector calculation in response to the change in the secondary resistance $r_2$.

In practice, however, it is difficult to measure the temperature of the rotor due to the nature of its construction. Furthermore even when such measurement is possible, it will be imprecise. Indirect measurement of temperature by calculation also is imprecise.

Moreover, the relation between the temperature and the secondary resistance $r_2$, and the relation between the secondary resistance $r_2$ and the intensity of the magnetic flux, differ depending upon the individual induction motors. To set such relations, therefore, the motors must be investigated beforehand a very cumbersome operation. Further, it is difficult to precisely establish the relations. In addition to the secondary resistance $r_2$, the excitation inductance which affects the intensity of magnetic flux, undergoes a change depending upon the frequency and the temperature. Therefore, it is difficult to set the slip frequency at the optimum value, and it is not possible to obtain magnetic flux of the required intensity. Consequently, it becomes difficult to control the induction motor maintaining good response characteristics, though this should be the main feature of the vector control method.

SUMMARY OF THE INVENTION

The present invention aims to eliminate the above-mentioned defects, and its object is to provide a method and an apparatus of controlling induction motors, which is capable of setting the slip frequency to the optimum value thereby to realize control, maintaining good response characteristics.

The feature of the present invention resides in a method and apparatus of controlling induction motors, in which a difference is found between a flux instruction value and a detected flux value, a value for correcting the slip frequency is found by the flux difference based upon a slip frequency instruction value that is determined by the torque component in the primary current, and the slip frequency of the induction motor is controlled so as to become equal to the sum of the slip frequency instruction value and the value for correcting the slip frequency.

DETAILED DESCRIPTION OF THE PREFERRED EMBODIMENT

Figure 1:
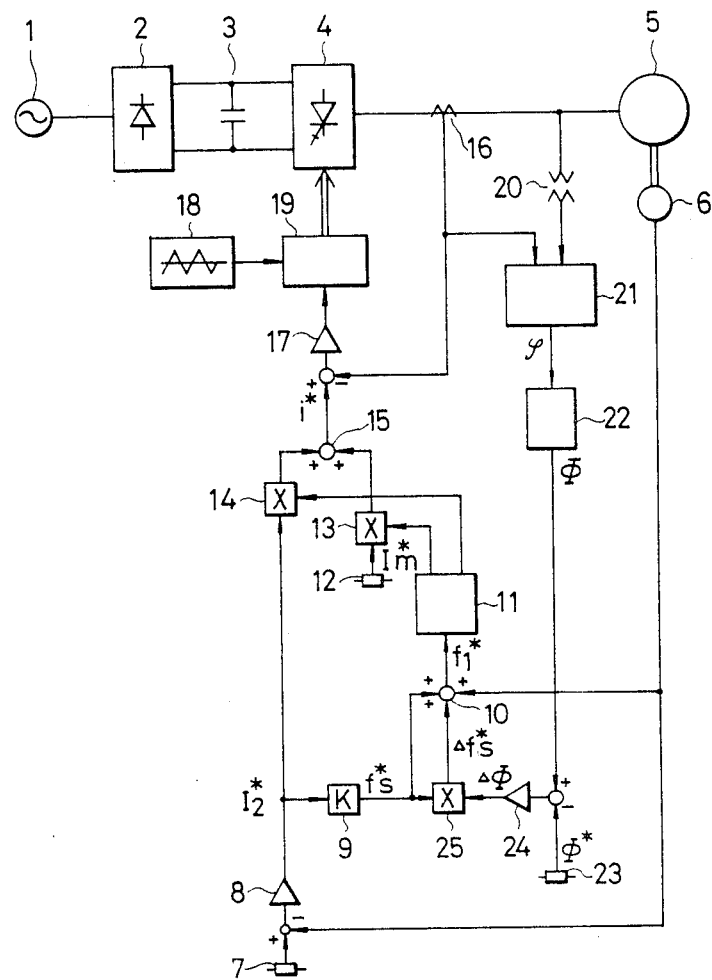
FIGS. 1, 6 and 8 are diagrams showing embodiments of the present invention.

FIG. 1 illustrates an embodiment of the present invention, in which reference numeral 1 denotes an alternating-current power source, 2 denotes a rectifier for converting the alternating current into a direct current, 3 denotes a capacitor which restrains the pulsation of voltage in the d-c circuit, 4 denotes an inverter which produces a-c power of a variable voltage and a variable frequency, 5 denotes an induction motor which is driven by the inverter 4, 6 denotes a speed detector which detects the running speed of the induction motor 5, 7 denotes a speed setting device which issues instruction for the running speed of the induction motor 5, 8 denotes a speed control circuit which depends upon the difference between the outputs of the speed setting device 7 and the speed detector 6, the output of the speed control circuit 8 serving as a torque instruction signal $I_2^*$ which determines torque current flowing into the induction motor, 9 denotes a slip frequency operation unit which performs calculation according to the equation (1) to produce a slip frequency instruction signal $f_s^*$, 10 denotes an adder which adds the output signals of the slip frequency operation unit 9, speed detector 6 and multiplier 25 which will be mentioned later, the output signal of the adder 10 serving as a signal to determine the primary frequency $f_1^*$ of the induction motor 5, 11 denotes an oscillator which produces two-phase sinusoidal waves of the signal $f_1^*$ of the primary frequency produced by the adder 10, 12 denotes an excitation current component setting device which produces a predetermined excitation current component instruction $I_m^*$, 13 and 14 denote multipliers, 15 denotes an adder which produces a signal that dictates the instantaneous value i of the primary current of the induction motor 5, 16 denotes a current detector which detects the instantaneous value of the primary current that flows into the induction motor 5, 17 denotes a current control circuit which is responsive to the difference between the outputs of the adder 15 and the current detector 16 and generates a signal which is proportional to the output voltage of the inverter 4, i.e., proportional to the fundamental wave of the primary voltage of the induction motor 5, 18 denotes a triangular wave generator which generates signals of a triangular waveform, and 19 denotes a PWM signal generator which compares the output signals of the current control circuit 17 with the output signals of the triangular wave generator 18 to produce gate signals which turn on and off the main circuit elements in the inverter 4.

Operation of the thus constructed circuit has been widely used, and is hence mentioned below only briefly. The speed control circuit 8 produces a signal which corresponds to the difference between the outputs of the speed setting device 7 and the speed detector 6, i.e., produces a torque current instruction $I_2^*$. The excitation current component setting device 12 produces an excitation current instruction $I_m^*$. The slip frequency instruction $f_s^*$ has been set by the slip frequency operation unit 9. Therefore, if the slip frequency instruction $f_s^*$, running-speed signal of the induction motor 5 detected by the speed detector 6, and a slip frequency correction signal $\Delta f_s^*$ that will be mentioned later, are added together through the adder 10, the signal produced by the adder 10 generates a primary frequency instruction $f_1^*$ for the induction motor 5. Thus, the oscillator 11 produces two-phase sinusoidal wave signals given by sin $(2\pi f_1^* t)$ and cos $(2\pi f_1^* t)$, where t denotes the time.

Upon receipt of the above-mentioned four signals $I_2^*$, $I_m^*$, sin $(2\pi f_1 t)$ and cos $(2\pi f_1 t)$, through the multipliers 13 and 14, the adder 15 produces the following signal $i^*$ for issuing instruction for an instantaneous value of the primary current, $$i^* = I_m^* \sin(2\pi f_1 t) + I_2^* \cos(\pi f_1 t) \quad (2)$$

$$= I_1^* \sin(2\pi f_1 t + \theta)$$

where, $$I_1^* = \sqrt{(I_m^*)^2 + (I_2^*)^2} \quad (3)$$

$$\theta = \tan^{-1}(I_2^*/I_m^*)$$

The current control circuit 17 the triangular wave generator 18 and PWM signal generator cause the inverter 4 to operate on PWM signals, and whereby the primary current varies in proportion to the instruction $i^*$.

Thus, the induction motor 5 runs at a speed which corresponds to the speed instruction given by the speed setting device 7.

Parts designated at 20 to 25 in FIG. 1 constitute a circuit which corrects the error of slip frequency instruction $f_s^*$ which is set by the slip frequency operation unit 9. Reference numeral 20 represents a voltage detector which detects the primary voltage of the induction motor 5, 21 represents a magnetic flux intensity operation circuit which calculates the intensity $\varphi$ of the magnetic flux of the induction motor 5 relying upon the signals produced by the voltage detector 20 and the current detector 16, 22 denotes a rectifier circuit which finds the intensity $\phi$ of magnetic flux, 23 denotes a flux setting device which produces instruction $\phi^*$ of the flux intensity, 24 stands for a flux control circuit which produces a signal that corresponds to the difference between the outputs of the flux setting device 23 and the rectifier circuit 22, and 25 denotes a multiplier which multiplies the output of the slip frequency operation unit 9 by the output of the flux control circuit 24. The output of the multiplier 25 serves as a signal of the correction quantity, $\Delta f_s^*$ for the slip frequency instruction $f_s^*$.

Figure 4:
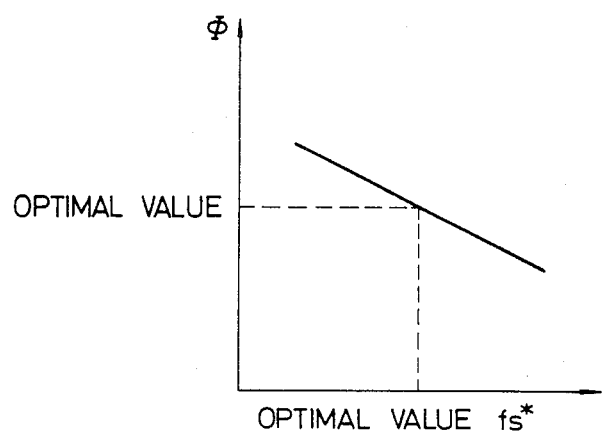
FIG. 4 is a diagram showing a relation between the magnetic flux and the slip frequency.

Operation of the circuit will be described below. If an error is contained in the slip frequency obtained by the slip frequency operation unit 9, the intensity magnetic flux of the induction motor 5 deviates from the instruction value $\phi^*$. That is, if the slip frequency instruction $f_s^*$ is set to be greater than an optimum value, the magnetic flux intensity becomes smaller than a preset value. Conversely, if the slip frequency instruction $f_s^*$ is set to be smaller than the optimum value, the magnetic flux intensity $\Phi$, becomes greater than the preset value. The rectifier circuit 22 generates the magnetic flux $\Phi$, and the flux control circuit 24 produces a signal which corresponds to a difference $\Delta \phi$ between the detected magnetic flux intensity $\Phi$ and the instruction $\Phi^*$ thereof. If the signal $\Delta \phi$ is multiplied by the slip frequency instruction $f_s^*$ of the slip frequency operation unit 9 through the multiplier 25, the resulting output is a correction quantity. $\Delta f_s^*$ for the slip frequency. The flux difference $\Delta \phi$ increases with the increase in the error of the slip frequency instruction $f_s^*$, which results in an increased correction quantity $\Delta f_s^*$. Further, when the slip frequency instruction $f_s^*$ is greater than a optimum value, the magnetic flux intensity $\Phi$ becomes smaller than a preset value $\Phi_s^*$, and the correction quantity $\Delta f_s^*$ assumes a negative value. Therefore, the primary frequency instruction $f_1^*$ returns to the optimum value. Conversely, if the slip frequency instruction $f_s^*$ is set to be smaller than the optimum value, the correction quantity $\Delta f_s^*$ assumes a positive value, and the primary frequency instruction $f_1*$ returns to the optimum value. FIG. 4 illustrates the relation between the magnetic flux intensity $\Phi$ and the slip frequency instruction $f_s*$.

Figure 2:
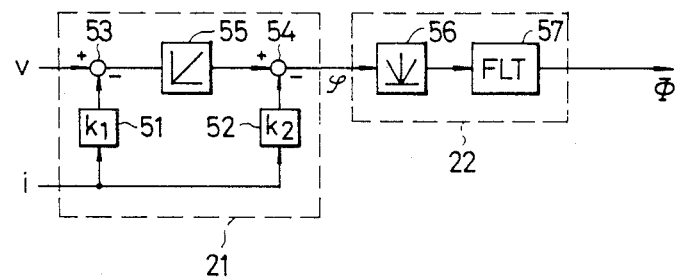
FIG. 2 is a diagram illustrating in detail portions of FIGS. 1 and 6.

FIG. 2 illustrates a concrete block diagram of the magnetic flux operation circuit 21 and the rectifier circuit 22, in which reference numerals 51 and 52 denotes constant setters, 53 and 54 denote subtractors, 55 denotes an integrator, 56 denotes an absolute value circuit for rectifying input signals, and 57 denotes a filter for smoothing ripples contained in the signals produced by the absolute value circuit 56. If instantaneous values of the primary voltage and primary current of the induction motor 5 detected by the voltage detector 20 and current detector 16 are denoted by v and i, the magnetic flux intensity $\varphi$ is given by, $$\phi = \int \left\{ v - \left( ri + \frac{di}{dt} \right) \right\} dt \qquad (4)$$
$$= \int (v - ri) dt - li$$
$$= \int (v - k_1 i) dt - k_2 i$$

where r and l denote resistance and leakage inductance of the induction motor 5.

The constant setters 51 and 52 set constants $k_1$, $k_2$ of the equation (4). The subtractors 53, 54 and the integrator 55 perform the calculation of the equation (4). If the magnetic flux $\varphi$ is detected, intensity $\phi$ of the magnetic flux is detected through the absolute value circuit 56 and the filter 57.

Figure 3:
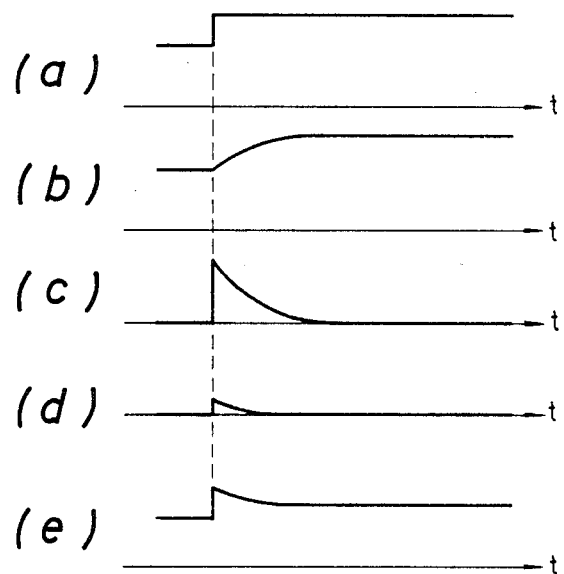
FIG. 3 is a diagram which illustrates the operation of FIGS. 1 and 6.

FIG. 3 illustrates operation waveforms when the present invention is put into practice. In FIG. 3, the diagram (a) shows a speed instruction, the diagram (b) shows running speed of the induction motor 5, the diagram (c) shows the slip frequency instruction signal $f_s*$ produced by the slip frequency operation unit 9, the diagram (d) shows the signal produced by the multiplier 25, which is the correction quantity $\Delta f_s*$ for the slip frequency, the diagram (E) shows a signal which is produced by the adder 10 and which serves as the signal $f_1*$ for instruction for the primary frequency. Output signal $f_s*$ of the slip frequency operation unit 9 is multiplied through the multiplier 25 by the output signal $\Delta\Phi$ of the magnetic flux control circuit 24 to obtain a correction quantity $\Delta f_s*$. Therefore, the correction quantity $\Delta f_s*$ changes following the slip frequency instruction signal $f_s*$. Therefore, even if the response of the magnetic flux control circuit 24 is delayed, the correction quantity $\Delta f_s*$ changes responsive to the slip frequency instruction signal $f_s*$ which corresponds to the required torque as shown in FIG. 3, making it possible to control the torque while maintaining precision and high-response characteristics.

Figure 5:
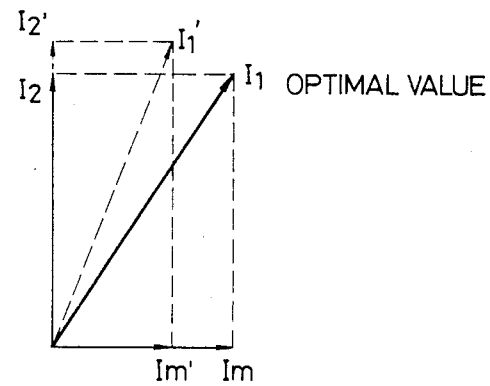
FIG. 5 is a vector diagram for illustrating the effects of the present invention.

FIG. 5 is a diagram of current vectors when the present invention is adapted, in which $I_1$ denotes a primary current, Im denotes a real excitation current component, and $I_2$ denotes a real torque current component. When the circuit of the present invention does not work while the slip frequency instruction signal $f_s*$ is set to be greater than the optimum value, the primary current $I_1$, excitation current $I_m$ and torque current $I_2$ take the values denoted by broken lines $I_1'$, $I_m'$ and $I_2'$. Namely, the excitation current becomes smaller than the optimum value, and the magnetic flux intensity becomes smaller than the optimum value. Therefore, the torque may become relatively small, and the speed response characteristics may be low. According to the present invention, however, optimum current vectors can be maintained irrespective of error in the slip frequency instruction signal $f_s*$, and the speed can be controlled maintaining good response characteristics.

According to the present invention as described above, the slip frequency can be maintained at the optimum value even when the secondary resistance $r_2$ varies, and the torque produced by the induction motor can be controlled precisely while maintaining high response characteristics.

Figure 6:
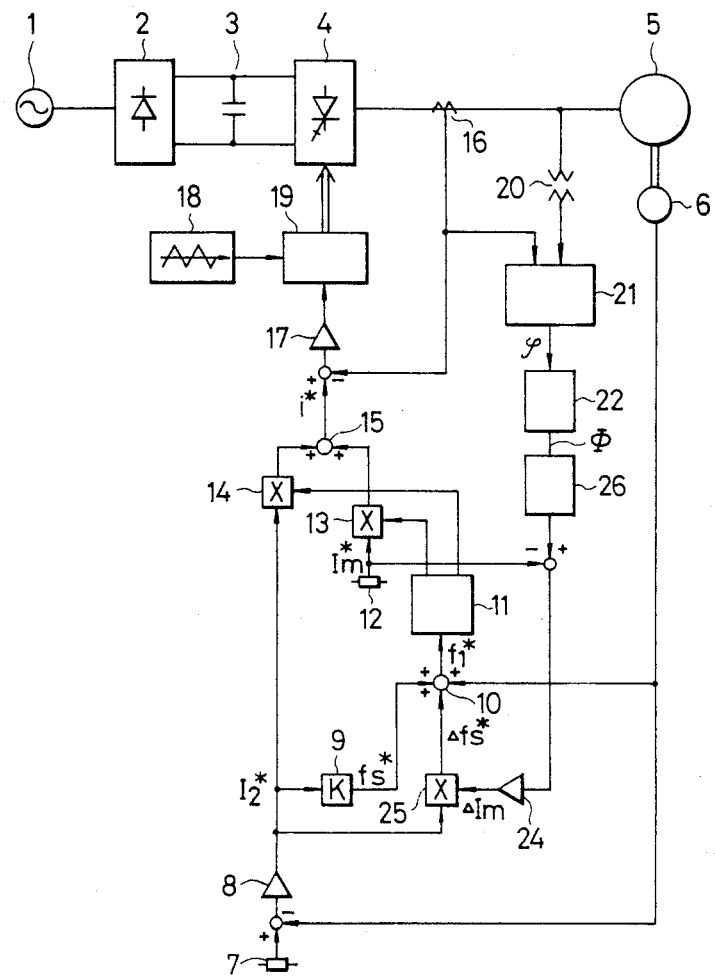
Figure 8:
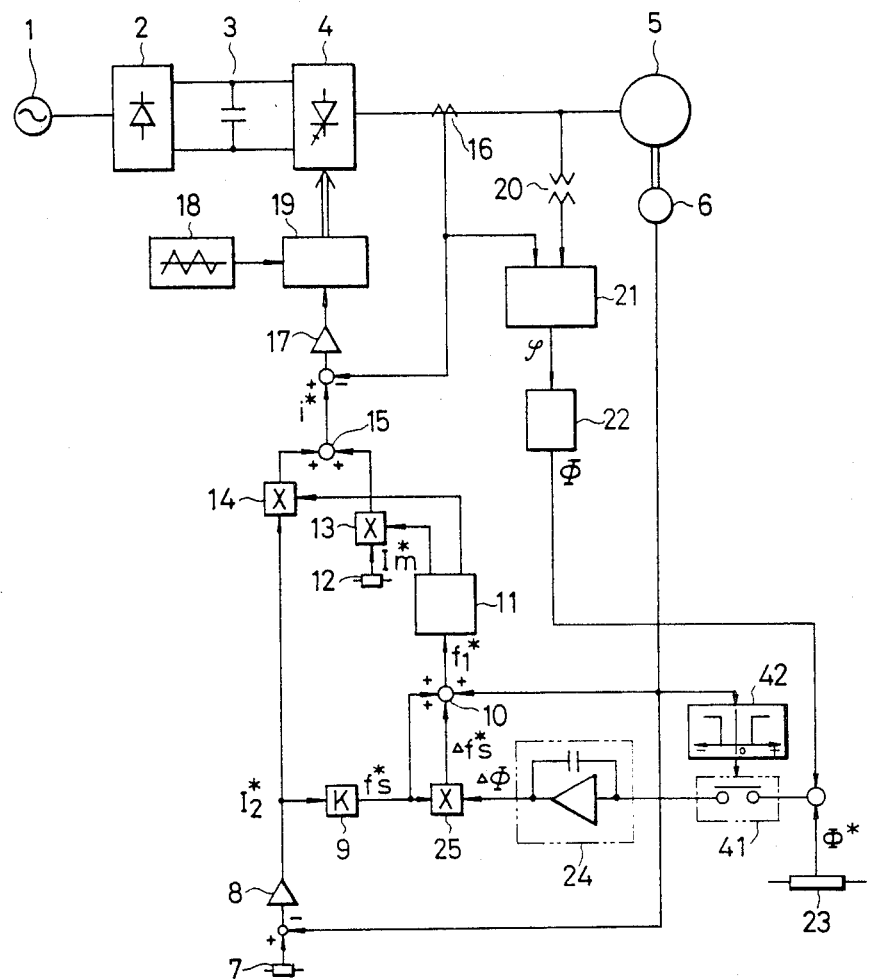

FIG. 6 illustrates another embodiment of the present invention. The embodiment only differs in the circuit to obtain a signal $\Delta I_m$ corresponding the difference signal $\Delta\Phi$ from the embodiment shown in FIG. 1. In the embodiment of FIG. 6, 26 denotes detector of the excitation current component $I_m$ of the primary current $I_1$ and has characteristics of $(1/l_m)$ $(1+TS)$. Where $l_m$ and T denote the secondary leakage reactance and time constant of the induction motor 5.

As well known, the excitation current $I_m$ is given by the following relation, $$I_m = \frac{\Phi}{l_m} (1 + TS) \qquad (5)$$

detector 26 generates the signal $I_m$ corresponding the signal $\Phi$. The flux control circuit 24 generates the differential signal $\Delta I_m$ between the outputs of the excitation current component setting device 12 and detector 26. The multiplier 25 multiplies the output of the speed control circuit 8 by the output of the flux control 24 and generates the correction quantity $\Delta f_s*$. In this case, even if the output of the speed control circuit 8 is substituted by the output of the slip frequency operation unit 9, the correction quantity $\Delta f_s*$ is of substantially the same value is obtained.

Figure 7:
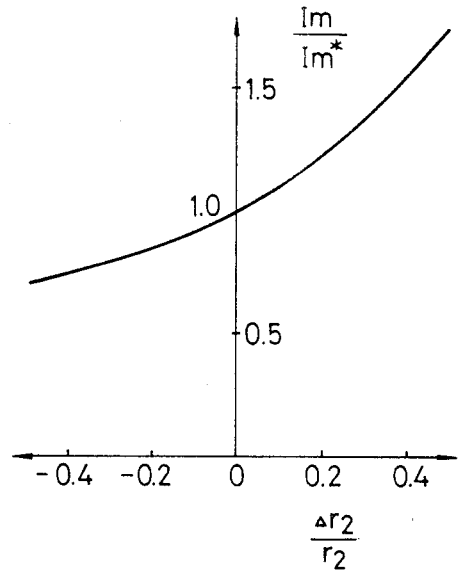
FIG. 7 is a diagram showing a relation between a ratio of the excitation current component $I_m$ of the primary current of the induction motor and an instruction value $I^*_m$ thereof and a ratio of a value $\Delta r_2$ of the secondary resistance change and the value $r_2$ of the secondary resistance.

As shown in FIG. 7, when a temperature of the motor 5 changes, namely the ratio $(\Delta r_2/r_2)$ changes, the ratio $(I_m/I_m*)$ changes. The same effect, therefor, is obtained by correcting the slip frequency instruction $f_s*$ according to the difference value $\Delta I_m$.

Although the embodiment has dealt with the case of using the PWM inverter, the present invention can be put into practice by using a current-type inverter or a cycloconverter, as a matter of course.

What is claimed is:

1. In a method of controlling induction motors in which the primary current of an induction motor is controlled, being divided into an excitation component and a torque component, and a slip frequency is instructed responsive to the torque component, the improvement wherein a flux difference is detected between a flux instruction value and a real flux value of said induction motor, a value for correcting the slip frequency is found by said flux difference based upon the magnitude of a value for instructing the slip frequency, and the slip frequency of said induction motor is controlled so as to become equal to the sum of said value for instructing the slip frequency and the value for correcting the slip frequency.

2. A method according to claim 1, including adding the value for instructing the slip frequency and the value for correcting the slip frequency to provide a sum of the value for instructing the slip frequency and the value for correcting the slip frequency, the slip frequency of the induction motor being controlled in accordance with the sum.

3. A control apparatus according to claim 2 wherein said means for setting the magnetic flux intensity of said induction motor sets an excitation current value which is related to flux intensity, and said means for detecting the magnetic flux intensity of said induction motor detects the excitation current of said induction motor as a value related to magnetic flux intensity.

4. A control apparatus for an induction motor comprising:
   an A.C. source,
   a converter for generating D.C. voltage from said A.C. source,
   an inverter for generating A.C. voltage from the output of said converter, the phase and frequency of which are controlled by an instruction signal,
   an induction motor driven by the output of said inverter,
   speed setting means for said induction motor,
   speed detecting means for said induction motor,
   a speed control unit for generating a torque current instruction signal corresponding the difference between the outputs of said speed setting means and detecting means,
   a slip frequency operation unit for generating a slip frequency instruction signal corresponding the output of said speed control unit,
   means for setting the magnetic flux intensity of said induction motor,
   means for detecting the magnetic flux intensity of said induction motor,
   means for detecting the difference between the outputs of the corresponding magnetic flux intensity of set value and detected value,
   multiplying means for generating a correcting signal for slip frequency instruction by multiplying the output corresponding to the output of said speed control unit by the output of said difference detecting means corresponding to magnetic flux intensity,
   means for generating a primary frequency instruction signal for the induction motor by adding said output of the speed control unit, multiplying means and speed detecting means, and
   control means for controlling the induction motor in accordance with the output of said speed control unit and primary frequency generating means.

5. A method for controlling an induction motor by controlling the primary current wherein the primary current is divided into an excitation component and a torque component, the method comprising the steps of instructing a slip frequency value in accordance with the torque component, detecting a value representative of a flux difference between a flux instruction value and an actual flux value of the induction motor, determining slip frequency correction value in accordance with the flux difference value and the magnitude of the instructed slip frequency value, and controlling the slip frequency value of the induction motor to become equal to the sum of the instructed slip frequency value and the slip frequency correction value.

6. A method according to claim 5, wherein the slip frequency correction value is determined by multiplying the slip frequency instruction value and the flux difference value.

7. A method according to claim 6, further comprising the steps of detecting the speed of the induction motor, and generating a primary frequency instruction value for the induction motor in accordance with sum of the controlled slip frequency value and the detected speed value of the induction motor.

8. A method according to claim 5, further comprising the step of adding the instructed slip frequency value and the slip frequency correction value to provide a sum of the instructed slip frequency value and the slip frequency correcting value, the slip frequency value of the induction motor being controlled in accordance with the sum.

9. A method according to claim 8, wherein the slip frequency correction value is determined by multiplying the slip frequency instruction value and the flux difference value.

10. A method according to claim 9, further comprising the steps of detecting the speed of the induction motor, and generating a primary frequency instruction value for the induction motor in accordance with the sum of the controlled slip frequency value and the detected speed value of the induction motor.

* * * * *